Dec. 4, 1962   J. ERKELENS ET AL   3,066,396
APPARATUS FOR ASSEMBLING PARTS
Filed Feb. 3, 1960   4 Sheets-Sheet 1
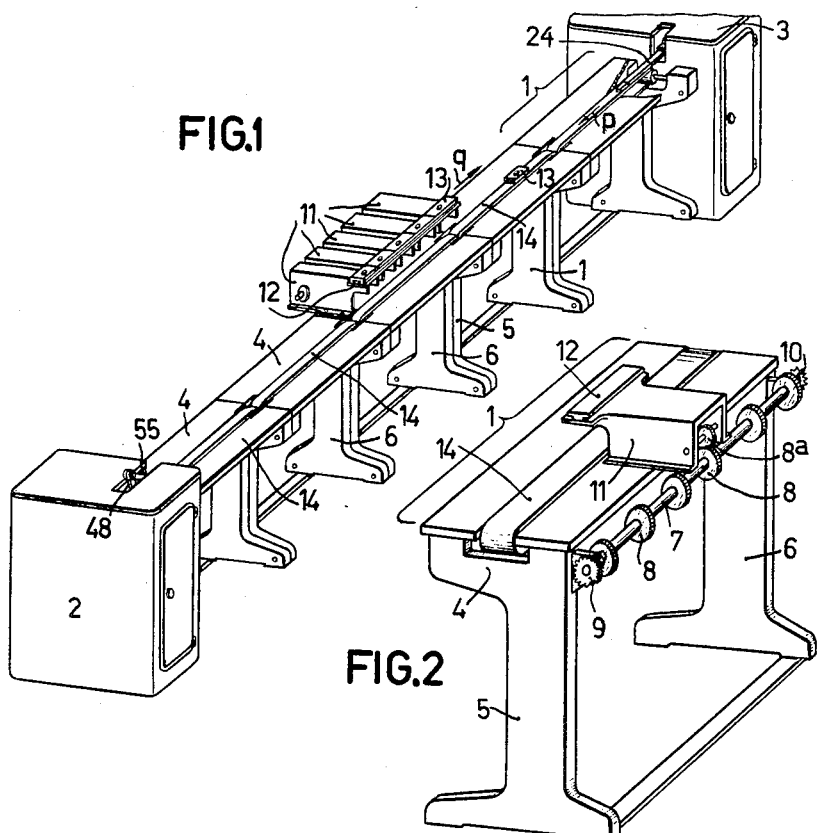
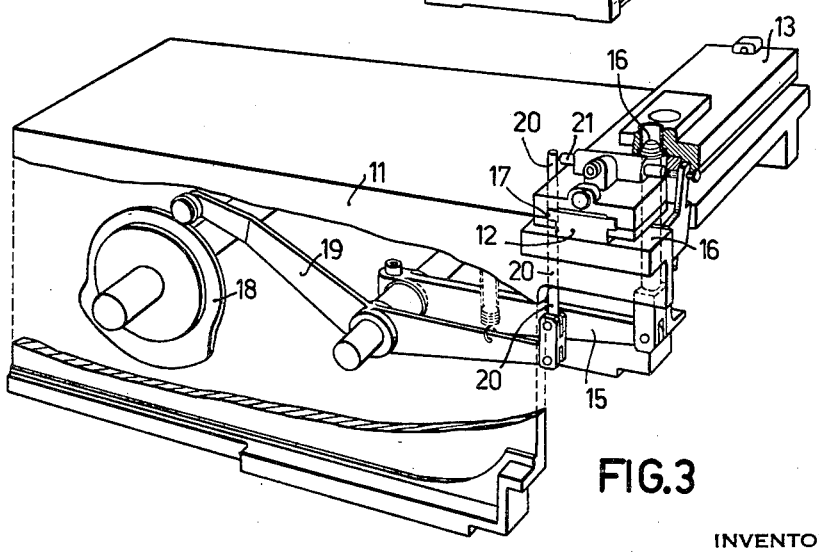
INVENTORS
JOHANNES ERKELENS
JOHANNES NIJBOER
BY
AGENT Dec. 4, 1962    J. ERKELENS ET AL    3,066,396
APPARATUS FOR ASSEMBLING PARTS
Filed Feb. 3, 1960    4 Sheets-Sheet 2

INVENTORS
JOHANNES ERKELENS
JOHANNES NIJBOER
BY
Frank R. Trifari
AGENT

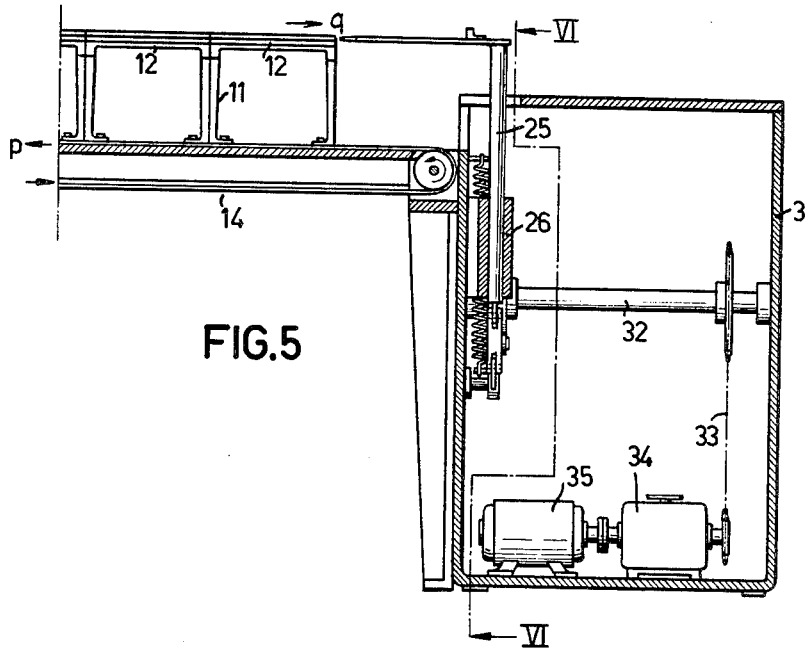
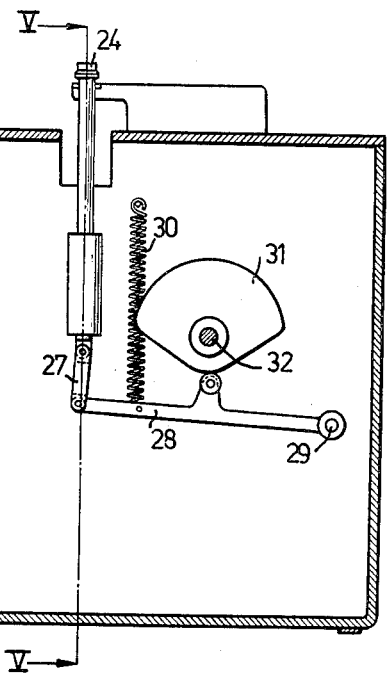

3,066,396
APPARATUS FOR ASSEMBLING PARTS
Johannes Erkelens and Johannes Nijboer, Eindhoven, Netherlands, assignors to North American Philips Company Inc., New York, N.Y., a corporation of Delaware
Filed Feb. 3, 1960, Ser. No. 6,407
Claims priority, application Netherlands Mar. 14, 1959
10 Claims. (Cl. 29—203)

For assembling products built up of a plurality of component parts, such as incandescent lamps, electron tubes, transistors, diodes and the like, so-called mills are known, that is to say machines having a table which frequently moves in a stepwise manner and in its various angular positions allows of assembling manipulations or, in certain cases, also mechanical treatments. If many manipulations are to be performed, the diameter of such a machine assumes large dimensions so that a large assembly area is required. In addition, the drive for the mechanisms in the various positions of the table and also the mechanism for the stepwise movement of the table become complicated and access to the whole of the vulnerable portion of the machine, which is incorporated at the centre, is difficult.

An object of the invention is to provide an assembling machine in which these disadvantages do not occur and which is convenient both in assembling and dismantling parts, while a good surveyability is obtained.

The machine according to the invention is particularly suited to be rapidly modified and adjusted for manufacturing another product so that it constitutes a flexible assembly in operation.

In order to attain these objects, the invention provides a machine unit for composing a machine comprising a row of such juxtaposed units for assembling incandescent lamps, discharge tubes, transistors, diodes and similar products, which machine unit comprises a frame having journalled in it at least one driving shaft which extends throughout the length of the unit so that the shafts of adjacent machine units can be coupled together said shafts having secured to them a plurality of driving members, such as gear wheels, for assembling elements which may be arranged as units on the frame so that guide tracks for transport slides provided one on each assembling unit become aligned, the slides being capable of being locked on the guide track in fixed positions and the frame comprising a transport track for conveying the slides back.

Such units constitute handy elements for composing a machine of any arbitrary length.

The assembling elements constitute separate assemblies which may be mounted, tested and adjusted elsewhere independently of the machine and which may be kept ready for use, for example when the machine is modified for assembling a different product.

In one embodiment of a machine unit according to the invention, at least one extremity of the driving shaft is provided with a chain wheel so that, when two machine units are placed side by side, the flat sides of the chain wheels of aligned driving shafts engage each other and may be coupled together by laying a chain over the two chain wheels.

Other couplings are also possible, but the one referred to is particularly handy, strong and simple.

In such machine units, which thus have the shape of an elongated table, all of the connections and ducts for electricity, compressed air and vacuum are arranged on the frame so as to be readily accessible and surveyable.

The invention also relates to an assembling machine composed of a row of machine units of the above-mentioned kind placed side by side and coupled together, in which at the ends of the row there are arranged closure elements comprising devices for bringing the transport slides from the guide track to the transport track in the units, and conversely.

The assembling elements require special attention within the scope of the invention.

In one important embodiment of the machine according to the invention, each assembling element contains a movable searching and centering pin which can co-act with a hole in the slide which is guided, for example, on a dovetail's guide, so that upon introducing the pin in the hole, the slide is arrested on the guide track in a fixed position.

The assembling elements must frequently be suitable for the supply of component parts to be mounted on the slide. In one embodiment of the invention, at least one assembling element is provided which carries an intermittently rotary table with containers for parts to be mounted regularly divided along the periphery of the table, a conveyer member for a part to be mounted being provided which can be caused to co-act with a container and an assembling template on a slide.

For a satisfactorily operating embodiment of an assembling machine according to the invention, it is very important to ensure that, if the supply of a part to be mounted to a slide is halted, no further parts are supplied on the further route of the slide, since this would give rise to parts becoming lost or at least supplied uselessly.

In one important embodiment of the machine according to the invention, the slide is provided with a memory pin which is controlled as a function of the presence of a member to be mounted on the slide and which can be moved into a position in which, on the further route of the slide, it prevents further supply of members to be mounted to the slide.

In order that the invention may be readily carried into effect, one embodiment thereof will now be described in detail, by way of example, with reference to the accompanying drawings, in which:

FIG. 1 is a perspective view of an assembling machine built up of machine units according to the invention;

FIG. 2 is a perspective view of a single machine unit;

FIG. 3 illustrates the device for arresting a slide on its guide track, together with the memory pin with accessories;

FIG. 5 shows diagrammatically a longitudinal section taken along the line V—V of FIG. 8;

FIG. 6 is a sectional view taken along the line VI—VI of FIG. 5;

Figure 4:
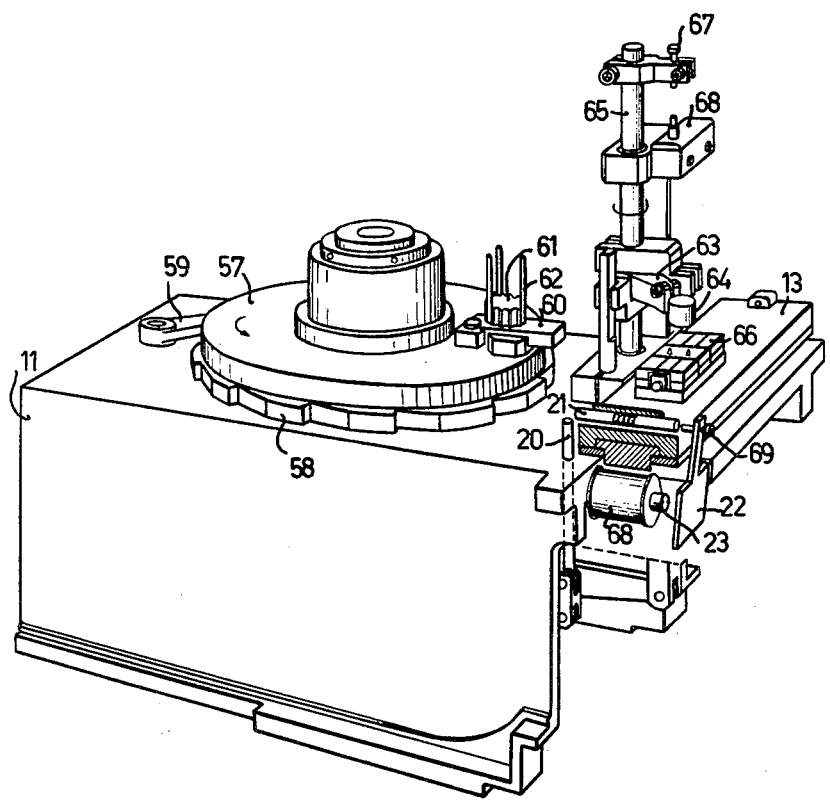
FIG. 4 shows an example of one embodiment of an assembling element.
Figure 7:
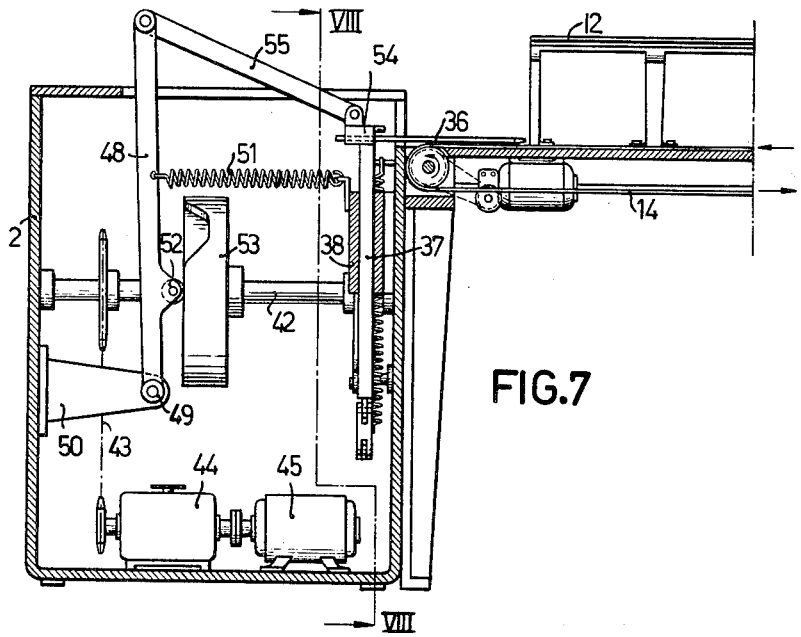
FIG. 7 shows diagrammatically a longitudinal section, taken along the line VII—VII of FIG. 8, of another closure element or terminal unit of the assembling machine according to the invention.

Referring now to FIGS. 1 and 2, the assembling machine is built up of juxtaposed machine units 1 and closure elements or terminal units 2 and 3.

Each machine unit 1 comprises a table 4 and legs 5 and 6. Behind the table 4 a driving shaft 7 is supported which in this embodiment carries gear wheels 8 at fixed intervals. The ends of driving shaft 7 are provided with chain wheels 9 and 10 respectively. When two units 1 are placed against each other in the manner illustrated in FIG. 1, the flat sides of the chain wheels on aligned shafts 7 engage each other. The engaging chain wheels may then be coupled together by laying a chain around the (not shown). The shafts 7 of juxtaposed units 1 may thus be coupled rapidly so that a unit may readily be removed from the row, if desired. Other couplings are also possible in this machine.

Driving mechanisms in assembling elements 11 positioned on the tables 4 in an exchangeable manner are driven from the driving shaft 7 which extends behind table 4. Thus, wheel 8 in FIG. 2 drives a wheel 8a in assembling element 11.

In the example shown in FIGS. 1 and 2, each table 4 is designed to accommodate side by side five assembling elements 11.

Similarly as driving shaft 7, all of the connections and pipe lines for electricity, compressed air and vacuum (not shown) are arranged behind the tables 4 so as to be easily accessible.

Each assembling element 11 comprises a piece of guide track 12 on which a slide 13 can be fixed in position. The slides 13 may be shifted in the longitudinal direction of the aligned and adjoining pieces of guide track 12 and thus be moved in a stepwise manner along the series of assemblying elements.

An endless belt 14 moves beneath the guide track 12. Such a belt 14 is arranged in each machine unit. All of these belts (see FIG. 1) move in the same direction (arrow p). They can convey the slides 13 under along guide track 12 back to the beginning (at closure unit 2 in FIG. 1) of the machine.

The slides 13 are moved on in a direction indicated by arrow q (FIG. 1).

In guide track 12 (FIG. 3) there is vertically movable, by means of a lever 15, an arresting pin 16 which has a searching edge and can engage in a hole of slide 13. The pin 16 is provided with a collar and by means thereof pushes the slide 13 a little upwards against horizontal faces of the guide track 12 and a little sidewards against a surface 17 of guide track 12. The slide 13 is thus exactly arrested on an assembling element 11 in a single position. This is necessary for accurate assembling.

FIG. 3 also shows a cam 18 which drives a lever 19 which moves a so-called memory pin 20 in a vertical direction.

Pin 21 moves in longitudinal direction transversely to slide 13 by means of a lever 22 which can be attracted, for example, by means of an electromagnet 23 (FIG. 4).

The operation of pin 21 with accessories will be explained further along in the description.

It will first be explained with reference to FIGS. 5 to 8 in what manner the slides 13 are moved along the guide tracks 12 and return along the belts 14. For this purpose, the closure units 2 and 3 (FIG. 1) are designed efficaciously.

FIGS. 5 and 6 show the terminal unit 3. Slides 13 moved in the direction of arrow q along the guide tracks 12 on the assembling elements 11 are pushed, upon reaching the end of guide track 12, one after another or a rod 24 secured to a sliding rod 25 which is guided in a sleeve 26 and which can move up and down via a link 27, a lever 28, which is pivoted at 29 and subject to the action of a spring 30 and a cam 31. A cam shaft 32 is driven via a chain transmission 33 and a driving mechanism 34 by means of an electric motor 35.

In FIG. 5, the rod 24 together with a slide 13 pushed on it may thus be moved downwards to the upper part of transport belt 14 which pulls the slide 13 off the rod 24 to convey it back to the other end (beginning) of the machine in the direction indicated by arrow p.

Figure 8:
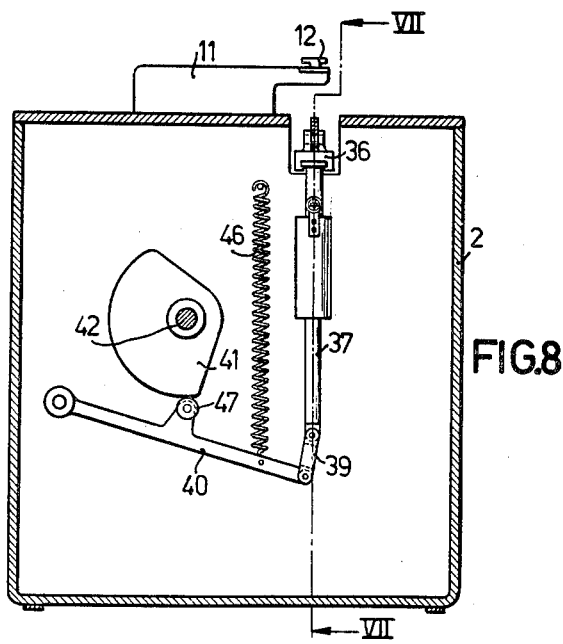
FIG. 8 is a sectional view taken along the line VIII—VIII of FIG. 7.

The slide 13 then reaches closure unit 2 (see FIGS. 1, 7 and 8) and is pushed by means of the upper part of the belt 14 onto a rod 36 secured to a sliding rod 37 which is vertically guided in a sleeve 38. The rod 37 is driven via a link 39 and a lever 40 by means of a cam 41 on a shaft 42, which is driven via a chain transmission 43 and a driving mechanism 44 of variable transmission ratio by means of an electric motor 45. The lever 40 is drawn by means of a spring 46 against cam 41 which it runs up by means of a roller 47 (FIG. 8).

Rod 36 together with a slide 13 pushed on it may be lifted by means of the drive 37–42 to the level of the guide track 12.

A lever 48 is pivoted, at 49, in a support 50 secured to the housing 2 and is maintained by means of spring 51, via its roller 52, against a cam 53 on shaft 42.

The lever 48 drives via a rod 55 a push into member 54 which, when rod 36 is at the level of guide track 12, can push a slide 13 from rod 36 and bring it on guide track 12.

The motor for driving belt 14 is indicated by 56.

FIG. 4 shows, by way of example, an assembling element 11 for bringing on slide 13 a mica plate, which is an important component part in the so-called package of an electron tube.

A rotary disc 57 has ratchet teeth 58 at its circumferenc and can periodically be rotated through an angle and arrested by means of a ratchet 59.

Placed in a circle on disc 57 are several magazines 60 containing mica plates in stacks 61. These mica plates are centered at their periphery and situated ready for use by means of these vertical pins 62.

Each time a mica plate has been taken out of a magazine, disc 57 rotates through an angle and it is the turn of a subsequent stack (not shown) to deliver a mica plate. This method of supply makes it more convenient to keep the stacks at the required level. A magazine 60 which no longer delivers at a given moment can in each case readily be supplemented.

A lever 63 provided with a suction cup 64 swings above one of the stacks of mica plates 61. The lever with its suction cup sinks and pushes on the stack of mica plates. A vacuum line is opened through a regulating valve and the upper plate caught by suction. The lever with its swinging rod 65 then moves upwards, swings above the assembling slide 13, then sinks and puts the mica plate on an assembling template 66.

The regulating valve shuts off the vacuum line and admits air so that the suction cup releases the mica plate.

The slide 13 is then moved on to the subsequent assembling element.

If, for some reason or other, a mica plate is missed or if the mica plate supplied is unduly thin, the supply and assembly of further component parts must be stopped. This is effected as follows:

If a mica, plate is not supplied, the suction cup 64 sinks through a thickness of an ordinary mica plate onto the assembling template 66. This distance is sufficient to actuate a micro-switch 68 mounted beneath it via an accurately adjusted set screw 67.

Consequently, a coil 68 is powered and electromagnet 23 is energized.

Lever 22 is attracted and its upper edge, which has been accurately adjusted by means of an adjusting screw 69, abuts pin 21, thus pushing it outside slide 13.

The slide 13 with its projecting pin 21 slides on to the subsequent assembling element 11. The first manipulation performed here is the mechanical pushing upwards of searching pin 20 (see also FIG. 3). If in the preceding assembling element the process is accomplished normally and hence pin 21 does not project outside the slide, pin 20 does not encounter any resistance and a component part is mounted. However, if pin 21 projects outside the slide, pin 20 is prevented from moving upwards, since lever 15 (FIG. 3) cannot go up. As a result thereof, the supply of component parts to be mounted is halted.

The supply and assembly of component parts is thus prevented on the further route along the assembling elements.

A slide 13 can be moved on along guide track 12 when its locking pin 16 has moved downwards. This moving on is effected by means of the succeeding slides.

Other assembling elements may be designed for the supply of other component parts, such as grids, cathodes, anodes and screens to the assembling template 66 on the slides 13.

It is to be noted that it is possible on an assembling element, for example by means of cutting members and shaped jaws, to mount a member to be manufactured from strip material supplied, on the template 66 or in an auxiliary position on slide 13.

The design of the various assembling elements 11, which may be greatly varied, will not be described further in this specification, since it is not essential to the principle of the invention.

Parts are not touched by hand so that oxidation is prevented.

The machine always delivers a product of uniform quality. The saving in labour is considerable. The training time of operators is unnecessary. The machine is independent of conjuncture. In the case of increasing labor costs, the cost of the products delivered by the machine remains unchanged.

What is claimed is:

1. Apparatus for assembling parts comprising a plurality of units each including a frame having at least one driving shaft journalled therein which extends longitudinally of the unit for driving assembling elements operatively associated with said unit, means for coupling the shafts of adjacent units, a plurality of transport slides for carrying said parts being assembled, a guide track for each unit along which said slides can move, means to position and arrest the movement of each slide in each unit, means to select and transport a part to said slide to be assembled thereon, conveyor means for returning the slides to the first unit after passing the last unit, and means for transporting the slide from the guide track to the conveyor means following the last unit and for transporting the slide from the conveyor means to the guide track before the first unit.

2. Apparatus for assembling parts comprising a plurality of units each including a frame having at least one driving shaft journalled therein which extends longitudinally of the unit for driving assembling elements operatively associated with said unit, a toothed wheel secured to at least one end of each shaft for rotation therewith, said toothed wheel adapted to engage a like toothed wheel secured to the shaft of an adjoining unit, chain means operatively associated with said toothed wheels for driving said shafts, a plurality of transport slides for carrying said parts being assembled, a guide track for each unit along which said slides can move, means to position and arrest the movement of each slide, means to select and transport a part to said slide to be assembled thereon, conveyor means for returning the slides to the first unit after passing the last unit, means for transporting the slide from the guide track to the conveyor means following the last unit and for transporting the slide from the conveyor means to the guide track before the first unit.

3. Apparatus for assembling parts comprising a plurality of units each including a frame adapted to house power sources for easy access and having at least one driving shaft journalled therein which extends longitudinally of the unit for driving assembling elements operatively associated with said unit, means for coupling the shafts of adjacent units, a plurality of transport slides for carrying said parts being assembled, a guide track for each unit along which said slides can move, means to position and arrest the movement of each slide, means to select and transport a part to said slide to be assembled thereon, conveyor means for returning the slides to the first unit after passing the last unit, means for transporting the slide from the guide track to the conveyor means following the last unit and for transporting the slide from the conveyor means to the guide track before the first unit.

4. Apparatus for assembling parts comprising a plurality of units each including a frame adapted to house power sources for easy access and having at least one driving shaft journalled therein which extends longitudinally of the unit for driving assembling elements operatively associated with said unit, means for coupling the shafts of adjacent units, a plurality of transport slides each provided with a locating aperture therein for carrying said parts being assembled, a guide track for each unit along which said slides can move, means to position and arrest the movement of each slide including a moveable pin operatively associated with each assembling element and adapted to enter said locating aperture in said slide whereby movement thereof is arrested and said slide is fixedly positioned on the guide track for an assembly operation, means to select and transport a part to said slide to be assembled thereon, conveyor means for returning the slides to the first unit after passing the last unit, means for transporting the slide from the guide track to the conveyor means following the last unit and for transporting the slide from the conveyor means to the guide track before the first unit.

5. Apparatus for assembling parts comprising a plurality of units each including a frame adapted to house power sources for easy access and having at least one driving shaft journalled therein which extends longitudinally of the unit for driving assembling elements operatively associated therewith, means for coupling the shafts of adjacent units, a plurality of transport slides for carrying said parts being assembled, a guide track for each unit along which said slides can move, means to position and arrest the movement of each slide, storage means for selectively supplying parts to be assembled to said slide, means to select a part and transport the same to said slide for assembly thereon, conveyor means for returning the slides to the first unit after passing the last unit, means for transporting the slide from the guide track to the conveyor means following the last unit and for transporting the slide from the conveyor means to the guide track before the first unit.

6. Apparatus for assembling parts comprising a plurality of units each including a frame adapted to house power sources for easy access and having at least one driving shaft journalled therein which extends longitudinally of the unit for driving assembling elements operatively associated therewith, means for coupling the shafts of adjacent units, a plurality of transport slides for carrying said parts being assembled, a guide track for each unit along which said slides can move, means to position and arrest the movement of each slide, a rotatable member having a plurality of positions for the storage of parts to be assembled, means to transport a part from one of said storage positions to said slide for assembly thereon, means to advance the rotatable member to successive storage positions operatively associated with said slide whereby successive storage positions are advanced to meet each slide and a part transported therefrom to each slide, conveyor means for returning the slides to the first unit after passing the last unit, means for transporting the slide from the guide track to the conveyor means following the last unit and for transporting the slide from the conveyor means to the guide track before the first unit.

7. Apparatus for assembling parts comprising a plurality of units each including a frame adapted to house power sources for easy access and having at least one driving shaft journalled therein which extends longitudinally of the unit for driving assembling elements operatively associated with said unit, means for coupling the shafts of adjacent units, a plurality of transport slides for carrying said parts being assembled, a guide track for each unit along which said slides can move, means to position and arrest the movement of each slide, storage means for selectively supplying parts to be assembled to said slide, means to select and transport a part to said slide for assembly thereon, pin means associated with said slide for determining the presence thereon of said part, conveyor means for returning the slides to the first unit after passing the last unit, means for transporting the slide from the guide track to the conveyor, means for transporting the slide from the guide track to the conveyor means following the last unit and for transporting the slide from the conveyor means to the guide track before the first unit.

8. Apparatus for assembling parts comprising a plurality of units each including a frame adapted to house power sources for easy access and having at least one driving shaft journalled therein which extends longitudinaly of the unit for driving assembling elements operatively associated with said unit, means for coupling the shafts of adjacent units, a plurality of transport slides for carrying said parts being assembled, a guide track for each unit along which said slides can move, means to position and arrest the movement of each slide, storage means for selectively supplying parts to be assembled to said slide, means to select and transport a part to said slide for assembly thereon, pin means associated with said slide for determining the presence thereon of said part, means operatively associated with said parts, transport and selection means and responsive to the presence of a part to actuate said pin means to prevent the further supply of parts to be mounted on said slide, conveyor means for returning the slides to the first unit after passing the last unit, means for transporting the slide from the guide track to the conveyor means following the last unit and for transporting the slide from the conveyor means to the guide track before the first unit.

9. Apparatus for assembling parts comprising a plurality of units each including a frame adapted to house power sources for easy access having at least one driving shaft journalled therein which extends longitudinally of the unit for driving assembling elements operatively associated with said unit, means for coupling the shafts of adjacent units, a plurality of transport slides for carrying said parts being assembled, a guide track for each unit along which said slides can move, means to position and arrest the movement of each slide, storage means for selectively supplying parts to be assembled to said slides, means to select and transport a part to said slide for assembly thereon, pin means associated with said slide for determining thereon the presence of said part, electro-responsive means for actuating said pin means in the presence of said part to prevent delivery of further parts, conveyor means for returning the slides to the first unit after passing the last unit, means for transporting the slide from the guide track to the conveyor means following the last unit and for transporting the slide from the conveyor means to the guide track before the first unit.

10. Apparatus for assembling parts comprising a plurality of units each including a frame adapted to house power sources for easy access having at least one driving shaft journalled therein which extends longitudinally of the unit for driving assembling elements operatively associated with said unit, means for coupling the shafts of adjacent units, a plurality of transport slides for carrying said parts being assembled, a guide track for each unit along which said slides can move, means to position and arrest the movement of each slide, storage means for selectively supplying parts to be assembled to said slide, means to select and transport a part to said slide for assembly thereon, pin means associated with said slide for determining the presence thereon of said part, switch means responsive to the presence of the part on the slide, coil means responsive to the operation of said switch for actuating said pin means to prevent the further delivery of parts to said slide, conveyor means for returning the slides to the first unit after passing the last unit, means for transporting the slide from the guide track to the conveyor means following the last unit and for transporting the slide from the conveyor means to the guide track before the first unit,

References Cited in the file of this patent

UNITED STATES PATENTS

| | | |
|---|---|---|
| 1,147,373 | Clark | July 20, 1915 |
| 1,999,657 | Heath | Apr. 30, 1935 |
| 2,217,973 | Snader | Oct. 15, 1940 |
| 2,451,683 | Mantle | Oct. 19, 1948 |
| 2,540,315 | Andrews | Feb. 6, 1951 |
| 2,559,369 | Phillips | July 3, 1951 |
| 2,860,404 | Alden | Nov. 18, 1955 |
| 2,873,513 | Carlzen | Feb. 17, 1959 |
| 2,902,181 | Hauck | Sept. 1, 1959 |

UNITED STATES PATENT OFFICE
CERTIFICATE OF CORRECTION

Patent No. 3,066,396            December 4, 1962

Johannes Erkelens et al.

It is hereby certified that error appears in the above numbered patent requiring correction and that the said Letters Patent should read as corrected below.

Column 2, line 69, for "the" read -- them --; column 3, line 54, for "or" read -- on --; column 4, line 46, after "mica" strike out the comma.

Signed and sealed this 3rd day of September 1963.

(SEAL)
Attest:

ERNEST W. SWIDER            DAVID L. LADD
Attesting Officer            Commissioner of Patents